April 28, 1953     H. B. SCHULTHEIS ET AL     2,636,386
SENSING DEVICE HAVING ADJUSTABLE THRESHOLD RESPONSE
Filed May 23, 1949
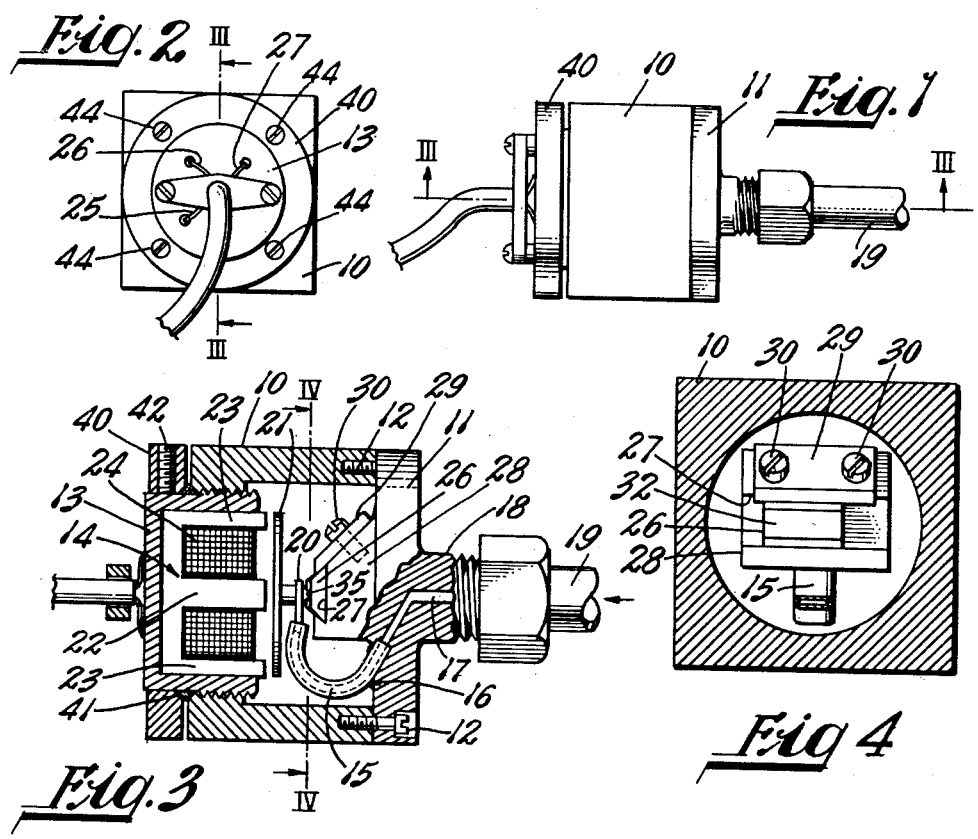
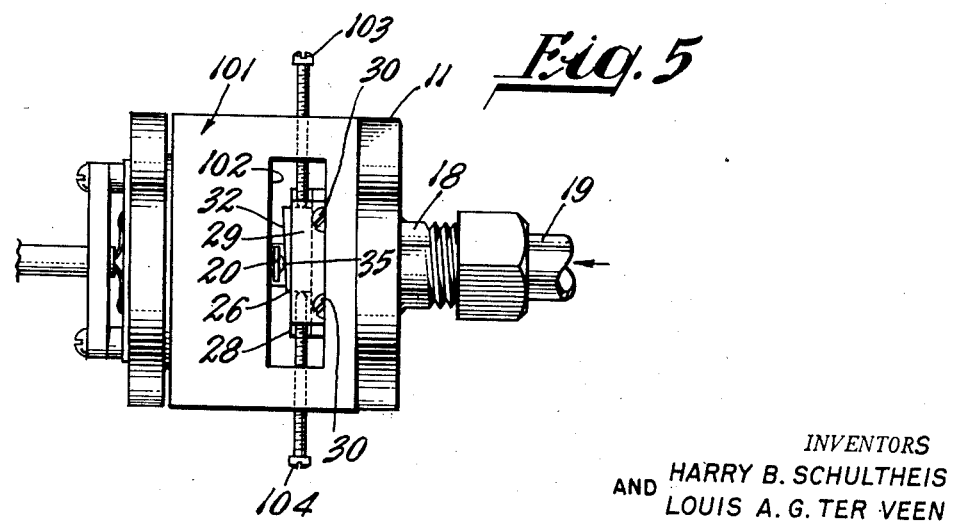
INVENTORS
HARRY B. SCHULTHEIS
AND LOUIS A. G. TER VEEN
BY *E. Woodbury*

Patented Apr. 28, 1953

2,636,386

UNITED STATES PATENT OFFICE 2,636,386

SENSING DEVICE HAVING ADJUSTABLE THRESHOLD RESPONSE

Harry B. Schultheis, Pacoima, and Louis A. G. ter Veen, North Hollywood, Calif., assignors to Bendix Aviation Corporation, South Bend, Ind., a corporation of Delaware Application May 23, 1949, Serial No. 94,918

3 Claims. (Cl. 73—398)

This invention relates to sensing devices for producing electrical values proportional to the magnitude of a condition to be measured.

An object of the invention is to provide a sensing device, the threshold response of which can be adjusted to meet the requirements of the particular situation.

A more specific object is to provide a pressure sensing device the threshold response of which can be accurately adjusted to respond to a desired minimum pressure.

Other more specific objects and features of the invention will appear from the description to follow.

Briefly stated, as applied to pressure sensing, the invention comprises a modification of prior known pressure sensing devices of the type in which a Bourdon tube constitutes the mechanical element movable in response to pressure changes. In a conventional sensing device of this type, the Bourdon tube assumes its normal, unstressed position at zero pressure; hence in conventional devices, if the tube is not to have excessive movement when measuring high pressures it must be made relatively stiff, which naturally reduces the sensitivity of response to small pressure changes.

Where the entire range of pressures from zero to a high value must be sensed, there is no escape from the use of a stiff tube, and the resultant lack of sensitivity. However, in accordance with this invention, where only a limited range of high pressures is to be sensed, good sensitivity within that range is obtained by employing a relatively light tube, and placing in the path of the free end of the tube a limiting stop that prevents it from returning past the position corresponding to the lower end of the range of pressures to be sensed. For successful use, the stop must be capable of very accurate adjustment, and a feature of the present invention is a stop construction permitting such accurate adjustment and a jig for facilitating the adjustment.

A particular embodiment of the invention will now be described in detail with reference to the drawing, in which:

Fig. 1 is a top or plan view of a pressure sensing instrument incorporating the invention;

Fig. 2 is an end view looking at the left end of Fig. 1;

Fig. 3 is a longitudinal section taken in the plane III—III of Figs. 1 and 2;

Fig. 4 is a cross section taken in the plane IV—IV of Fig. 3; and

Fig. 5 is a plan view showing a portion of the sensing device of Figs. 1 to 4 positioned in an adjusting jig for adjustment of the zero position.

Referring to Figs. 1, 2, 3 and 4, the instrument therein depicted comprises a casing having a tubular section 10 closed at its right end by an end section 11 which may be attached to the casing section 10 by screws 12, and closed at its left end by a cup 13 which contains a variable inductance element 14.

The pressure-responsive portion of the instrument is mounted on the end section 11 and comprises a resilient member in the form of a Bourdon tube 15 which is anchored at its right end, as by brazing 16, to the end section 11 and is connected by a passage 17 in the end section to a threaded nipple 18 whereby it can be connected through a conventional fitting to a tube 19 extending to the source of the pressure to be measured. The left or free end of the Bourdon tube 15 is closed, and has secured thereto, by a connecting element 20, an armature 21 which is associated with the variable inductance element 14. The latter, as shown, may be an inductor of the type commonly referred to as an E coil having a central leg 22 and end legs 23 with a winding 24 on the center leg. Commonly, three taps 25, 26 and 27 (Fig. 2) are taken off the winding 24, one from each end and one from the middle of the winding, which are connected to an oscillating circuit, the E coil constituting one element of the tuner for the oscillator so that variations in the inductance of the winding 24 change the frequency of the oscillations, the frequency being a measure of the pressure being sensed. The inductance of the winding 24 is of course varied in response to the movement of the armature 21 toward and away from the ends of the core elements 22 and 23.

Devices as manufactured in the past have corresponded generally to the structure so far described, the free end of the Bourdon tube 15 being unrestrained mechanically, so that it was in a condition of rest under zero pressure. In accordance with the present invention, the device is adapted for responding to a range of pressures having as its lower limit a value well above zero, by providing a stop that limits return movement of the free end of the Bourdon tube.

This stop comprises a wedge 26 that is supported for longitudinal movement in a guideway 27 in a stationary member consisting of a block 28 mounted on or formed integrally with the casing end section 11, one side of the guideway being constituted by a plate 29 secured to the block 28 by screws 30. By tightening the screws, the wedge 26 can be locked in any position of longitudinal adjustment in the guideway 27. As best shown in Fig. 5, the outer face 32 of the wedge 26 is inclined longitudinally and bears against a projection 35 on the right side of the connecting element 20, thereby limiting return movement of the free end of the Bourdon tube when the pressure therewithin is reduced.

In this way a relatively light Bourdon tube 15 can be employed to measure a range of relatively high pressures, say from 500 to 1000 p. s. i., with relatively high sensitivity, because the entire range of movement of the armature 21 toward and away from the electromagnet 14 is utilized within the desired range. On the other hand, if the stop were not employed, the Bourdon tube 15 would have to be made sufficiently stiff so that the total movement over the range from zero to 1000 p. s. i. would be within the permissible limits. Hence the movement of the armature 21 within the desired range from 500 to 1000 p. s. i. would only be half as great, and the sensitivity would be correspondingly reduced.

The wedge 26 is moved longitudinally to adjust the minimum pressure at which the projection 35 leaves the wedge. This adjustment was found rather difficult with conventional adjusting mechanisms but can be readily performed on the wedge 26 by means of the jig shown in Fig. 5. This jig comprises a tubular casing element 101 corresponding to the casing section 10 in Fig. 1 but differing therefrom in having a window 102 and in having a pair of adjusting screws 103 and 104 threaded through the walls at diametrically opposite points.

To effect adjustment, the end section 28 having the wedge 26 and Bourdon tube 15, all as shown in Fig. 3, is prior to attachment to its own tubular casing section 10, secured to the test jig 101, with its wedge 26 in alignment with the adjusting screws 103 and 104. The pressure corresponding to the lower end of the desired pressure range is then applied through the tube 19 to the Bourdon tube, and the wedge 26 is adjusted longitudinally by means of the screws 103 and 104 into the position where it barely contacts the projection 35, whereupon the wedge is locked in this position by tightening the holding screws 30. To facilitate accurate determination of the contact between the projection 35 and the wedge, the leads from the magnet structure within the test jig may be connected to a suitable oscillator circuit having a frequency indicating meter connected thereto. When the projection 35 is first displaced by contact with the surface 32 of the wedge 26, the frequency meter will indicate a change in frequency.

It is to be noted that the adjustment of the wedge 26 to establish the minimum pressure the device is to respond to is not necessarily related to the adjustment of the spacing between the armature 21 and the pole faces of the electromagnet 14. However, after the adjustment of the wedge has been completed, the end section 11 is removed from the jig 101 and assembled to its associated tubular casing section 10 containing the electromagnet 14. Proper adjustment of the air gap between the armature 21 and the pole faces of the electromagnet is then made by screwing the cut 13 in or out of the casing 10. During this adjustment, a clamping ring 40 is very lightly clamped against a gasket 41 to frictionally restrain rotation of the cup 13 and retain it in any position in which it is turned. When adjustment is effected, the clamp ring 40 is screwed up tight against the gasket 41 by the screws 44 (Fig. 1), and one or more lock screws 42 in the clamp ring are turned down tight.

Although the invention is primarily useful in and disclosed in connection with a pressure-sensing device employing a Bourdon tube, it is obviously applicable to other types of sensing devices in which a resilient member is deflected in response to a phenomenon to be measured.

Although for the purpose of explaining the invention, a particular embodiment thereof has been shown and described, obvious modifications will occur to a person skilled in the art, and we do not desire to be limited to the exact details shown and described.

We claim:

1. A sensing device comprising: a casing; a resilient member anchored at one point to said casing and having a free portion proportionately deflectable in one direction from a normal position of rest in response to a variation to be sensed over a range of values from zero to a large value; electrical means having an element mounted on said free portion for producing electrical variations proportional to deflection of said free portion; a stationary member anchored to said casing and having a wedge guideway adjacent to said free portion of said resilient member and extending substantially perpendicular to the path of deflection of said free portion; a wedge seated in said guideway for longitudinal movement therein and having an inclined face for contacting said free portion over a range of longitudinal positions of the wedge in said guideway, the wedge variably stopping the return movement of said free portion at different points in its path according to the longitudinal position of the wedge in said guideway; and means for locking said wedge in any position of adjustment in the guideway.

2. A sensing device according to claim 1 in which said casing comprises two separable sections on the first of which said resilient element and wedge are mounted, the second section cooperating with said first section to form an enclosure; said second section having adjusting screws engageable with opposite ends of said wedge for accurately shifting it, and having an opening for access to said wedge locking means.

3. A sensing device comprising: a casing; a resilient member anchored to said casing and having a free portion proportionately deflectable in one direction from a normal position of rest in response to a variation to be sensed over a range of values from zero to a large value; electrical means having an element mounted on said free portion for producing electrical variations proportional to deflection of said free portion; a stationary member anchored to said casing and having a wedge backing surface extending substantially perpendicular to the path of deflection of said free portion; a wedge adjustably movable along said backing surface and oriented to present different thicknesses between said backing surface and said free portion in different positions of movement; and screw means for accurately moving said wedge along said backing surface.

HARRY B. SCHULTHEIS.
LOUIS A. G. TER VEEN.

References Cited in the file of this patent

UNITED STATES PATENTS

| Number | Name | Date |
| --- | --- | --- |
| 631,809 | Nicla et al. | Aug. 29, 1899 |
| 841,743 | Wall et al. | Jan. 22, 1907 |
| 878,423 | Raynes | Feb. 4, 1908 |
| 891,627 | MacKenzie | June 23, 1908 |
| 1,718,494 | Schurig | June 25, 1929 |
| 2,334,543 | Connolly | Nov. 16, 1943 |
| 2,459,155 | Erickson et al. | Jan. 18, 1949 |
| 2,563,899 | Wiancko | Aug. 14, 1951 |

FOREIGN PATENTS

| Number | Country | Date |
| --- | --- | --- |
| 10,066 | Great Britain | Mar. 3, 1904 |
| 676,673 | France | Feb. 26, 1930 |